United States Patent Office 3,105,796
Patented Oct. 1, 1963

3,105,796
PROCESS FOR THE PURIFICATION OF ACTH
Richard H. Johnson, Kalamazoo Township, Kalamazoo County, Mich., assignor to The Upjohn Company, Kalamazoo, Mich., a corporation of Michigan
No Drawing. Filed Nov. 12, 1952, Ser. No. 320,115
3 Claims. (Cl. 167—74)

The present invention relates to a process for the preparation of a novel composition of matter, and is more particularly concerned with the preparation of a new organic compound, i.e., adrenocorticotropic hormone (corticotropin) alginate, more briefly specified hereinafter as ACTH alginate, and with an improved process for the purification of ACTH which involves the use of ACTH alginate. The adrenocorticotropic hormone, ACTH, produced by the anterior lobe of the pituitary gland, is important in stimulating production of hormones such as corticosterone, 17-hydroxy - 11 - dehydrocorticosterone (cortisone), 17-hydroxycorticosterone (Compound F), and the like, by the adrenal cortex. The thus-produced adrenal cortex hormones have exhibited considerable physiological activity and are therapeutically necessary for the maintenance of bodily health. The adrenocorticotropic hormone has also proved to be useful in the remission of rheumatic diseases such as rehumatoid arthritis and rheumatic fever by stimulating the adrenal cortex, causing the secretion of physiologically active steroids.

It is therefore an object of the present invention to prepare new and useful ACTH alginate. A further object of the present invention is to provide a novel process for the preparation of ACTH alginate. An additional object is to provide a novel process for the purification of ACTH to a greater degree of ACTH activity per milligram of solids. Another object of the present invention is to purify ACTH to a greater degree of ACTH activity per milligram of solids by utilizing the novel ACTH alginate of the present invention. Other objects of the present invention will be apparent to one skilled in the art to which the invention pertains.

According to the process of the present invention, ACTH alginate is prepared by reacting ACTH with an algin, precipitating ACTH alginate, and recovering ACTH alginate from the reaction mixture. The physiological of ACTH utilized herein is based on a provisional U.S.P. corticotropin reference standard which is the basis for the U.S.P. units; each milligram of provisional standard is equivalent to 0.005 U.S.P. or international units. One international unit of ACTH is defined as the biological activity contained in one milligram of the international standard of ACTH which is held by the World Health Organization, and one U.S.P. unit of ACTH is equal to one international unit.

The algin compounds utilized as starting materials herein include alginic acid and metal salts thereof. Representative salts which can be employed include calcium alginate, zinc alginate, aluminum alginate, and the alkali-metal alginates, for example, sodium alginate, potassium alginate or the like.

In the process of the present invention, the algin compound, dissolved in water or suspended in an alcohol such as ethanol, methanol, isopropanol, or the like, is mixed with a water solution of ACTH, such as the acid acetone powder, usually having a pH of 2 or less, prepared according to Li et al. [J. Biol. Chem., 149, 413, (1943)]. The pH of the resulting mixture is adjusted to between about 2.5 and about 5.0, preferably between about 2.5 and about 3.5. The reaction can be conducted between about zero and fifty degrees centigrade, preferably at about twenty-five degrees centigrade. Reagents which can be utilized to adjust the pH include hydrochloric, acetic, trichloroacetic, and sulfuric acids, sodium hydroxide, ammonium hydroxide, or the like. In some instances the pH of the resulting mixture will be satisfactory for the precipitation of the ACTH alginate without the addition of the above noted reagents, since the pH of the starting reactants can vary over such a wide range. The pH of the starting reactants can also be adjusted initially, prior to the reaction, so that the pH of the resulting mixture falls between about 2.5 and about 5, and pH adjustment of the mixture thus becomes unnecessary. The mixture, having the desired pH, is preferably cooled to about five degrees centigrade, although other temperatures between about zero and about fifty degrees centigrade can also be employed, usually for a period between about thirty minutes and about three hours. The cooled mixture may then be centrifuged, the resulting precipitate washed with an acid of pH 2.5 to 7, and the precipitate dried by washing with any well-known water-miscible low-boiling solvent such as acetone, for example.

The assay of ACTH potency of the starting ACTH, of the novel ACTH alginate, and a purified ACTH produced by the present invention has been determined by the widely employed ascorbic acid depletion assay [Sayers et al. (Endocrinology, 42, 379 (1948)]. The ascorbic acid content is approximately the same in the two adrenals of the test rats employed, and the assay is based upon the depletion of ascorbic acid in the adrenal of hypophysectomized rats following the administration of corticotropin. The test is carried out approximately twenty-four hours after hypophysectomy in male rats weighing 120–160 grams at the time of hypophysectomy. The rats are divided into four to six groups of five to ten rats each and two or three doses of standard and test preparation are used, thus allowing a standardization of the test preparation against the provisional U.S.P. corticotropin reference standard. The left adrenal gland is first removed under barbiturate anesthesia in order to determine the amount of ascorbic acid present before injection of the test preparation. The test solution is then injected intravenously into a tail vein immediately after the removal of the left adrenal. One hour later the right adrenal is removed. The response to the injection is expressed as the difference between the concentrations of ascorbic acid in the left and right adrenal, and the concentration is expressed as milligrams of ascorbic acid per 100 grams of adrenal tissue.

The procedure for the purification of ACTH involves the elution of a column of ACTH alginate with a strong acid, preferably an acid solution having a pH of about 1.5 or less, for example, sulfuric, perchloric, nitric, or hydrochloric acid, which results in a release of refined acid-soluble ACTH from the ACTH alginate. The acid-insoluble algin remains in the column and can be readily re-used. The refined ACTH can be isolated from the acid mixture by any suitable method. Representatilve isolation procedure includes mixing the acid mixture with a precipitating agent such as acetone, methylethyl ketone, ethanol, or propanol, to precipitate the desired refined ACTH, and recovering the refined ACTH precipitate by filtration. The acid mixture can also be dialyzed, whereupon the non-dialyzable portion is lyophilized to produce refined ACTH. The purification process can also be accomplished in a batchwise operation, for example, by mixing the acid with ACTH alginate and centrifuging or filtering the mixture to obtain the acid-soluble purified ACTH whereupon refined ACTH is recovered from the acid mixture as outlined above.

The following examples will serve to illustrate the process and products of this invention, but the said invention is not to be considered as limited thereto.

Example 1

To fifty milligrams of sodium alginate suspended in one milliliter of ethanol was added nine milliliters of a water solution of ACTH containing 240 milligrams of ACTH and assaying 1.5 units per milligram. The resulting mixture was thoroughly mixed and sufficient 0.2 N hydrochloric acid was added thereto to bring the pH of the mixture to 3.4, whereupon a light colored precipitate was formed. The mixture was allowed to stand at ten degrees centigrade for 24 hourshh, centrifuged, decanted, and the resulting precipitate washed with two milliliters of pH 3.2 hydrochloric acid. The precipitate, dried by washing with acetone, weighed 120 milligrams, and assayed 1.76 units per milligram for a total of 212 units (59 percent of the starting potency). The decantate, 13.5 milliliters, assayed 6 units per milliliter for a total of 81 units (23 percent of the starting potency).

Example 2

In essentially the same manner as disclosed in Example 1, utilizing 100 milligrams of sodium alginate instead of the fifty milligrams of Example 1, produced 246 milligrams of ACTH alginate, assaying 0.89 unit per milligram for a total of 221 units. The decantate contained a total of 40 units of ACTH activity.

Example 3

In essentially the same manner as disclosed in Example 1, utilizing 75 milligrams of sodium alginate instead of the fifty milligrams of Example 1, produced 215 milligrams of ACTH alginate, assaying 2.0 units per milligram for a total of 430 units. The decantate contained a total of 40 units of ACTH activity.

Example 4

In essentially the same manner as disclosed in Example 1, utilizing 240 milligrams of sodium alginate instead of the fifty milligrams of Example 1, produced 212 milligrams of ACTH alginate, assaying 1.2 units per milligram for a total of 259 units. The decantate contained a total of 41 units of ACTH activity.

Example 5

Ten grams of acid-acetone powder, assaying 0.24 unit of ACTH per milligram, was mixed with 200 milliliters of double-distilled water, filtered, and the residue washed with fifty milliliters of double-distilled water. Four grams of alginic acid (prewashed with 0.1 molar hydrochloric acid, 0.1 molar acetic acid, fifty percent acetone, and acetone) was added to the combined filtrate and wash, and the pH of the mixture thereupon adjusted, with stirring, to 3.05 with one molar sodium hydroxide. The mixture was stirred an additional eight hours, centrifuged, and the supernatant decanted. The insoluble fraction was washed by resuspending and centrifuging with three fifty-milliliter portions of double-distilled water. The combined solution, containing the water washes and the original supernatant, had a pH of 2.52 and was found to contain 168 units of ACTH. The insoluble fraction was washed with twenty milliliters and with three ten-milliliter portions of 0.1 molar hydrochloric acid. The combined washes were placed in a boiling water bath for ninety minutes, and thereupon dialyzed against double-distilled water for eight hours. The non-dialyzable portion assayed 2.5 ACTH units per milligram, a total of 1840 units. The dialyzable fraction contained 230 units. The acid-washed insoluble fraction was again washed with 25 milliliters of 0.1 molar hydrochloric acid and an additional 450 units of ACTH thereupon recovered.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. In a process for the purification of ACTH, the steps of mixing ACTH with an algin, precipitating a complex of ACTH alginate at a pH between about 2.5 and about 5.0, separating the complex from the mixture, acidifying the ACTH alginate with an aqueous acid solution having a pH of less than about 1.5 to release acid-soluble ACTH from the complex, and separating purified ACTH from the thus-released acid soluble ACTH.

2. In a process for the purification of ACTH, the steps of mixing ACTH with alginic acid, precipitating a complex of ACTH alginate at a pH of between about 2.5 and about 5.0, separating the complex from the mixture, acidifying the complex with an aqueous acid solution having a pH of less than about 1.5 to release acid-soluble ACTH from the complex, and separating purified ACTH from the thus-released acid soluble ACTH.

3. In a process for the purification of ACTH, the steps of mixing ACTH with an alkali-metal alginate, adjusting the pH of the resulting mixture to between about 2.5 and about 5.0, separating a complex of ACTH alginate from the mixture, acidifying the complex with an aqueous acid solution having a pH of less than about 1.5 to release acid-soluble ACTH from the complex, and separating purified ACTH from the thus-released acid soluble ACTH.

References Cited in the file of this patent

Ouer: Annals of Allergy, volume 9, No. 3, May-June 1951, pages 346 to 348.

Ralli: Adrenal Cortex, 1951, p. 30.

Astwood: J.A.C.S., vol. 73, June 1951, pp. 2969 and 2970.

Unlisted Drugs, vol. 2, No. 8, page 85, August 31, 1950.

Lesser: Drug and Cosmetic Ind., vol. 61, pp. 761–762 and 842–47, December 1947.

Text: Recent Progress in Hormone Research, vol. VII, page 37 (1952).